Aug. 3, 1965  O. S. GRIFFITH  3,197,950
GRASS MOWER ATTACHMENT FOR EDGE-TRIMMING
Filed Sept. 25, 1963  2 Sheets-Sheet 1

Inventor:
Owen Samuel Griffith
BY Nolte & Nolte
Attorneys

Aug. 3, 1965    O. S. GRIFFITH    3,197,950
GRASS MOWER ATTACHMENT FOR EDGE-TRIMMING
Filed Sept. 25, 1963    2 Sheets-Sheet 2
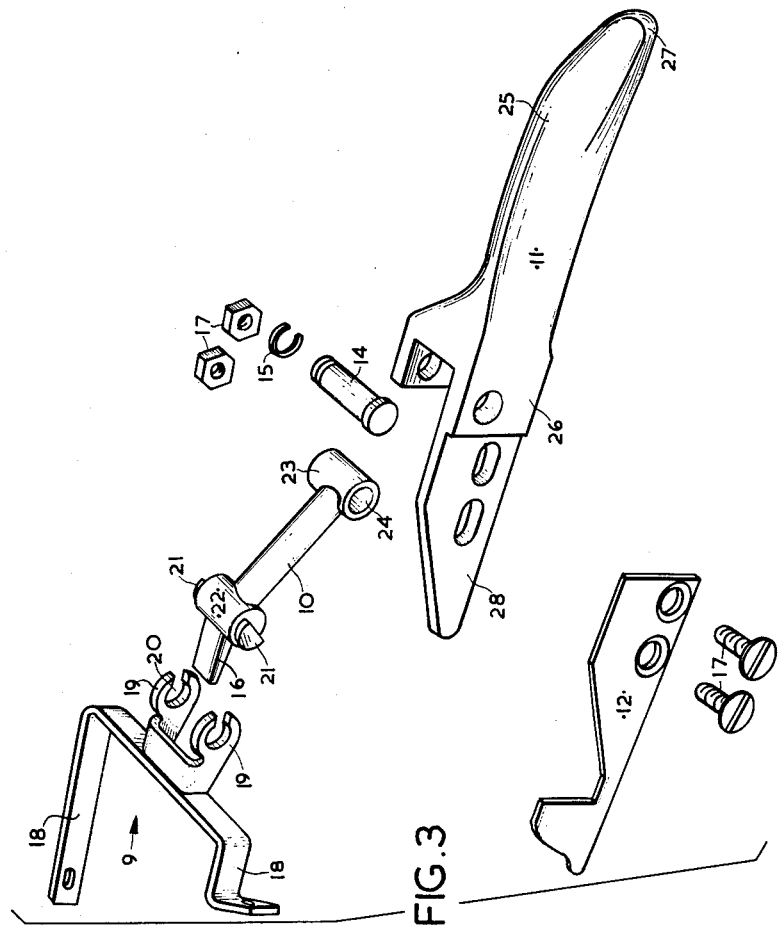
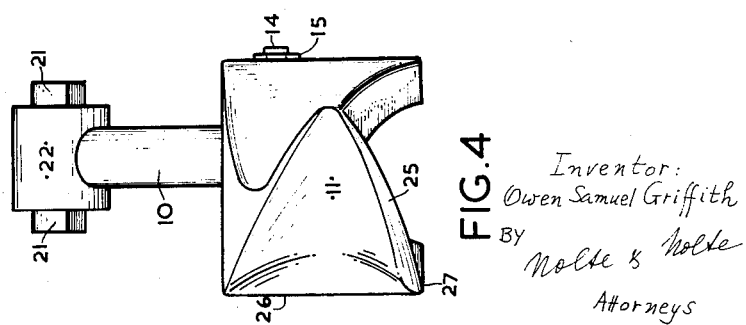
Inventor:
Owen Samuel Griffith
BY Nolte & Nolte
Attorneys

United States Patent Office 3,197,950
Patented Aug. 3, 1965

3,197,950
GRASS MOWER ATTACHMENT FOR
EDGE-TRIMMING
Owen Samuel Griffith, 19 Norfolk St., Killara,
New South Wales, Australia
Filed Sept. 25, 1963, Ser. No. 311,478
4 Claims. (Cl. 56—255)

This invention relates to attachments for grass-mowers wherein the attachment device is particularly arranged for edge-trimming.

The intensive development of grass-mowers of the rotary scythe type, especially for domestic use, has revealed certain limitations including the inability to satisfactorily mow grass edges or verges of sharply defined grass areas.

An example of such areas may be seen in grassed approaches to garages which are commonly divided by stone or other strips to form a track for the wheels of a vehicle.

Similarly, paths or other passages can be bounded by grassed areas the verges of which normally have to be trimmed by hand shears.

This procedure arises from the verge grass being unsupported by surrounding grass and therefore lacking the stiffness necessary to resist bending when struck by the mower blade.

The primary object of the present invention is to provide an edge-trimming attachment for grass-mowers whereby the said disadvantage is substantially removed.

Another object of the invention is to provide an attachment of the type defined wherein grass runners, such as are found with couch, paspalum and like grasses, extending beyond the grass verge to a contiguous ungrassed area will be mown.

According to the present invention such an attachment for a rotary scythe-blade type mower having a housing in which the rotary blades are contained includes a bracket adapted to be affixed to the blade housing, means pivotally and removably connecting a pick-up member to the bracket, and a backing-plate adjustably secured to the pick-up member.

An embodiment of the invention will now be described with specific reference to the accompanying drawings wherein:

FIGURE 3 is a perspective exploded view of the components comprising the attachment in accordance with the described embodiment of the invention, and FIGURE 4 is a front elevation of the pick-up member.

Figure 1:
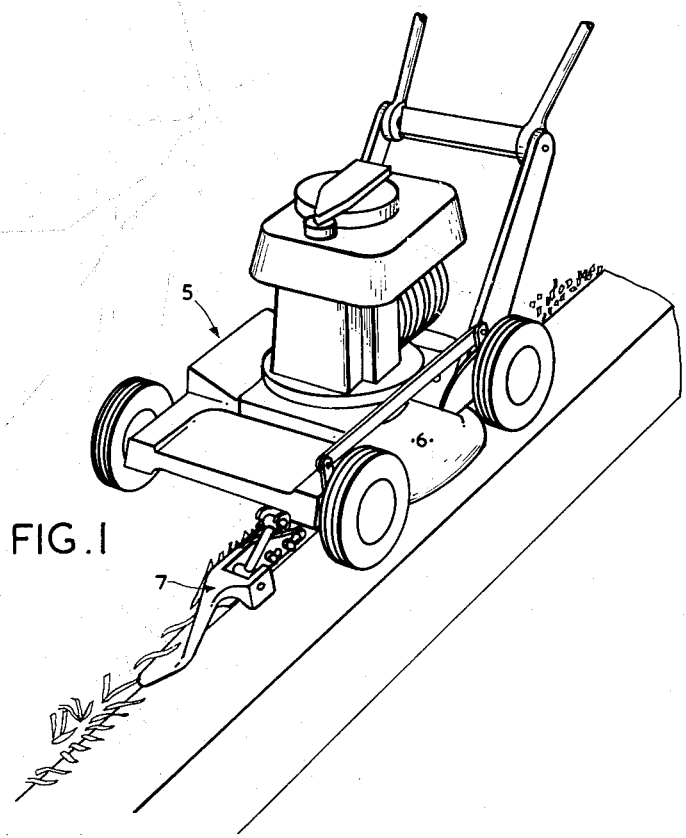
FIGURE 1 is a perspective view of a rotary scythe-blade type mower to which an attachment in accordance with the invention, is affixed.

Turning now to FIGURE 1 it will be seen that the mower is indicated generally as 5, the rotary scythe blade housing as 6 and the edge-trimming attachment, in general accordance with the invention, as 7.

The mower 5 is seen positioned on the grass verge against a curb and the manner in which the attachment 7 operates is clear.

Figure 2:
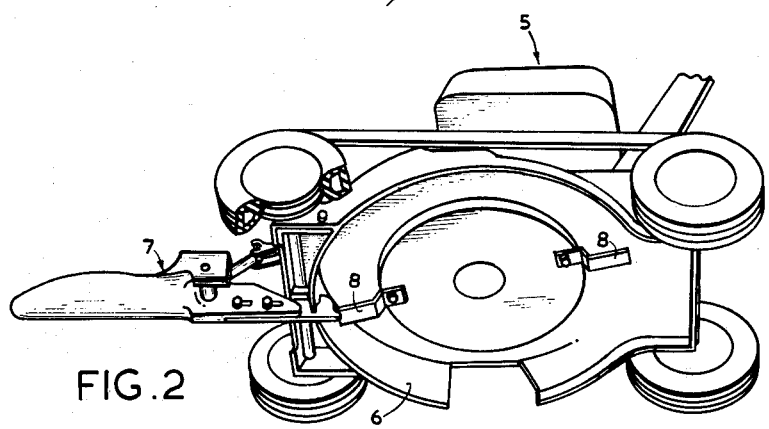
FIGURE 2 is a perspective under-side view of the mower and attachment of FIGURE 1.

FIGURE 2 shows the relation of the attachment 7 to the rotary scythe blades 8 within the housing 6.

The components forming the attachment 7 shown in FIGURES 1 and 2 may be readily recognized by reference to FIGURE 3 wherein is illustrated a bracket 9, a link member 10, pick-up member 11, an adjustable backing-plate 12, and fasteners comprising a pin 14 with circlip 15 by which the pick-up member 11 is pivotally secured to the crosshead 23 of link member 10, and bolts and nuts 17 for adjustably fixing the backing-plate 12 to the pick-up member 11.

The bracket 9 has legs 18, or other supports, by which it is affixed to the housing 6 of the mower 5 by screws, bolts and nuts or other fasteners, the arrangement conforming to the particular requirements of the housing to which the bracket 9 is secured.

At its normally forward end the bracket 9 incorporates a pair of lugs 19 spaced apart in parallel relationship and each having an aligned passage 20 therethrough. Each passage 20 is in the shape of a circular arc from the ends of which a radial open-ended slot extends to provide an entry.

The passages 20 in the lugs 19 receive D section stub-shaft extensions 21 provided on a first crosshead 22 on the link member 10, the said first crosshead 22 normally being at the rear end of the link member 10. The D-shaped stub-shafts 21 are proportioned to pass through the entry slots in the lugs 19 when the flat of each D is in sliding contact with the corresponding slot edge of the respective lugs 19. Upon being fully entered and partially rotated, the full diameter portion of the stub-shafts 21 will retain the link member in the lugs 19 until removal is made possible by bringing the flats of each D into line with the said slots.

At the opposite end of the link member 10 this is a second crosshead 23 having a passage 24 therethrough the axis of which is parallel to the axis of the first crosshead.

The second crosshead 23 is pivotally secured to the pick-up member 11 by a pintle 14 the assembly being maintained by a circlip 15.

The pick-up member 11 has a bottom ground-engaging surface, is preferably of substantial weight and is in the form of an elongated blade extending forward from its pivotal mounting heel portion 26, the blade face curving from a substantially horizontal plane at its toe 27 to a substantially vertical plane at its heel 26.

Extending rearwardly from the pick-up heel portion 26 is a lug 28 in which slots are provided to receive bolts adjustably securing backing-plate 12 to the pick-up member 11.

The backing-plate 12 is shaped to allow its normally rear end to be within the housing 6, the provision of adjustment permitting the rear extremity to be brought into close proximity to the scythe-blades 8 as may be seen in FIGURE 2.

The link member 10 has an extension or arm 16 extending rearwardly from the first crosshead 22 to provide a stop abutting to the bracket 9 when the mower front wheels are lifted off the ground. The arm 16 is positioned to allow the pick-up member 11 to be free to rise and fall sufficiently for normal mowing operations, and the arm 16 only coacting with the bracket 9 when the front of the mower is raised.

The edge cutting attachment in accordance with the present invention, is normally fitted to the mower blade housing 6 to one side of and spaced from the longitudinal centre line of the mower, with the blade 25 of the pick-up member 11 parallel thereto.

In operation the pick-up member 11 may be likened to a shoe which glides and can freely rise and fall on the surface being processed, the toe end of the member 11 moving under the overhanging grass runners which, with continued forward movement of the member 11, are elevated into a substantially perpendicular position for severance by the blade 8 on leaving the backing-plate 12, the latter plate being shaped to provide a support to the grass fronds or runners during the time of severance.

It may now be seen that blades of grass, or grass runners overhanging the verge of a grassed area can be efficiently and precisely trimmed with the attachment herein described when used with a mower of the rotary scythe blade type.

What I claim is:

1. A mower attachment comprising a pick-up member adapted to rest on the ground and to be moved along the ground during mowing operations, said pick-up member having a configuration which raises grass to be cut to a substantially upright position as said pick-up member is advanced along the ground, a backing-plate fixed to and extending rearwardly from said pick-up member and during use of the attachment being situated in a substantially vertical plane for receiving the substantially upright grass from the pick-up member and maintaining the grass in a substantially upright position, said backing-plate having a rear end portion adapted to be situated, during use of the attachment, in the immediate vicinity of rotary cutting elements of the mower so that the substantially upright grass will be presented by said backing-plate to said cutting elements of the mower to be cut thereby, a bracket adapted to be attached to the housing of a mower at a front portion of the housing, and connecting means extending between and operatively connecting said pick-up member to said bracket for transmitting movement of said bracket with the mower housing to said pick-up member so as to displace the latter along the ground, said connecting means at the same time freeing said pick-up member for free movement relative to said bracket according to the configuration of the surface along which the pick-up member moves so that the pick-up member is free to adapt itself to the surface on which it rests while remaining connected to said bracket for movement with the latter, said backing-plate being formed with a notch for receiving a front peripheral portion of the housing of the mower, said rear portion of said backing-plate extending rearwardly of said notch and forming the only part of the attachment which is situated within the mower housing.

2. A mower attachment comprising a pick-up member adapted to rest on the ground and to be moved along the ground during mowing operations, said pick-up member having a configuration which raises grass to be cut to a substantially upright position as said pick-up member is advanced along the ground, a backing-plate fixed to and extending rearwardly from said pick-up member and during use of the attachment being situated in a substantially vertical plane for receiving the substantially upright grass from the pick-up member and maintaining the grass in a substantially upright position, said backing-plate having a rear end portion adapted to be situated, during use of the attachment, in the immediate vicinity of rotary cutting elements of the mower so that the substantially upright grass will be presented by said backing-plate to said cutting elements of the mower to be cut thereby, a bracket adapted to be attached to the housing of a mower at a front portion of the housing, and connecting means extending between and operatively connecting said pick-up member to said bracket for transmitting movement of said bracket with the mower housing to said pick-up member so as to displace the latter along the ground, said connecting means at the same time freeing said pick-up member for free movement relative to said bracket according to the configuration of the surface along which the pick-up member moves so that the pick-up member is free to adapt itself to the surface on which it rests while remaining connected to said bracket for movement with the latter, said connecting means and bracket also cooperating with each other to limit the extent to which said pick-up member, at its region which is connected with said connecting means, can move downwardly relative to said bracket when said bracket is raised, as when a mower housing which carries said bracket is raised, said connecting means including an elongated link member having front and rear crossheads, said front crosshead being pivotally connected with said pick-up member and said rear crosshead being pivotally connected with said bracket, said connecting means including a lug extending rearwardly from said rear crosshead and said bracket having a wall located over said lug to engage the latter for limiting the extent to which said front crosshead can move downwardly.

3. A mower attachment comprising an elongated pick-up member adapted to rest on and move along the ground, said pick-up member being of substantial weight and having a rear heel portion and a front toe portion, said pick-up member having a grass-engaging face curving from a substantially horizontal plane at said toe portion to a substantially vertical plane at said heel portion, whereby during forward movement of said pick-up member along the ground grass will be engaged by said toe portion and will then be raised to a substantially upright position when said rear heel portion engages the grass, a backing-plate fixed to and extending rearwardly from said pick-up member, said plate being normally situated in a substantially vertical position so as to receive the upright grass from the heel portion and maintain it in an upright position, said backing-plate having a rear portion adapted to be situated in the immediately vicinity of cutting elements of the mower to present the substantially upright grass to the cutting elements to be cut thereby, a bracket adapted to be fixed to the housing of the mower, and an elongated link member interconnecting said pick-up member and said bracket, said link member having a front crosshead pivotally connected to said heel portion of said pick-up member and a rear crosshead pivotally connected to said bracket, and said backing-plate being formed at an upper edge portion with a notch for receiving a front peripheral portion of a mower housing so that the rear portion of said backing-plate which extends rearwardly from said notch will be received in the interior of the mower housing.

4. A mower attachment comprising an elongated pick-up member adapted to rest on and move along the ground, said pick-up member being of substantial weight and having a rear heel portion and a front toe portion, and said pick-up member having a grass-engaging face curving from a substantially horizontal plane at said toe portion to a substantially vertical plane at said heel portion, whereby during forward movement of said pick-up member along the ground grass will be engaged by said toe portion and will then be raised to a substantially upright position when said rear heel portion engages the grass, a backing-plate fixed to and extending rearwardly from said pick-up member, said plate being normally situated in a substantially vertical position so as to receive the upright grass from the heel portion and maintain it in an upright position, said backing-plate having a rear portion adapted to be situated in the immediate vicinity of cutting elements of the mower to present the substantially upright grass to the cutting elements to be cut thereby, a bracket adapted to be fixed to the housing of the mower, and an elongated link member interconnecting said pick-up member and said bracket, said link member having a front crosshead pivotally connected to said heel portion of said pick-up member and a rear crosshead pivotally connected to said bracket, said heel portion of said pick-up member and said backing-plate respectively having wall portions which directly engage each other, one of said wall portions being formed with an elongated substantially horizontally extending slot while the other of said wall portions is formed with an opening aligned with said slot, and a fastening member extending through the aligned opening and slot and fastening said backing-plate to said pick-up member while at the same time making it possible to adjust said backing-plate relative to said pick-up member to situate the rear portion of said backing-plate at a selected location relative to the cutting elements of the mower.

(References on following page)

References Cited by the Examiner

UNITED STATES PATENTS

| | | | |
|---|---|---|---|
| 689,803 | 12/01 | Hermann | 56—313 |
| 2,746,230 | 5/56 | Reimer | 56—312 |
| 2,782,583 | 2/57 | Oberle | 56—25.4 |
| 2,917,119 | 12/59 | La Monaca | 56—504 X |

FOREIGN PATENTS 243,164   2/63   Australia.

ABRAHAM G. STONE, *Primary Examiner.*

ANTONIO F. GUIDA, T. GRAHAM CRAVER,
*Examiners.*